United States Patent [19]

Tenthoff

[11] 4,411,645

[45] Oct. 25, 1983

[54] SYSTEMS OF SELF-PURGING CENTRIFUGAL SEPARATORS FOR THE SEPARATION AND CLARIFICATION OF LIQUIDS CONTAINING SOLIDS

[75] Inventor: Aloys Tenthoff, Oelde, Fed. Rep. of Germany

[73] Assignee: Westfalia Separator AG, Oelde, Fed. Rep. of Germany

[21] Appl. No.: 416,539

[22] Filed: Sep. 9, 1982

[30] Foreign Application Priority Data

Sep. 15, 1981 [DE] Fed. Rep. of Germany ....... 3136627

[51] Int. Cl.³ ....................... B04B 11/04; B01D 21/26

[52] U.S. Cl. .......................................... 494/3; 494/10; 494/11; 494/37

[58] Field of Search ................. 210/86, 147, 138, 326, 210/360.1; 494/1, 2, 3, 10, 11, 31, 32, 37, 42

[56] References Cited

U.S. PATENT DOCUMENTS 1,553,141 9/1925 Clark .................................... 494/31

3,582,934 6/1971 Zumhulsen ........................... 494/11

3,976,242 8/1976 Hemfort ................................ 494/3

*Primary Examiner*—Robert W. Jenkins

*Assistant Examiner*—Arthur D. Dahlberg

*Attorney, Agent, or Firm*—Sprung, Horn, Kramer & Woods

[57] ABSTRACT

A system of self-purging centrifugal separators for the separation and clarification of liquids, especially heavy oil, which contain solids, has a first separator serving for preliminary separation and a second, clarifying separator connected to the output of the first. Each of these separators is purged of accumulated solids by means of associated controls, the second separator being additionally provided with an automatic purging control. The solids chamber of the clarifier drum is smaller than that of the drum of the first separator and the purging control communicates through a control line with an evaluator and the evaluator in turn communicates with the controls and/or with an alarm, whereby a premature disturbance due to the accumulation of sludge in the first separator is detected and eliminated by extra purges or is signaled by means of the alarm.

3 Claims, 1 Drawing Figure

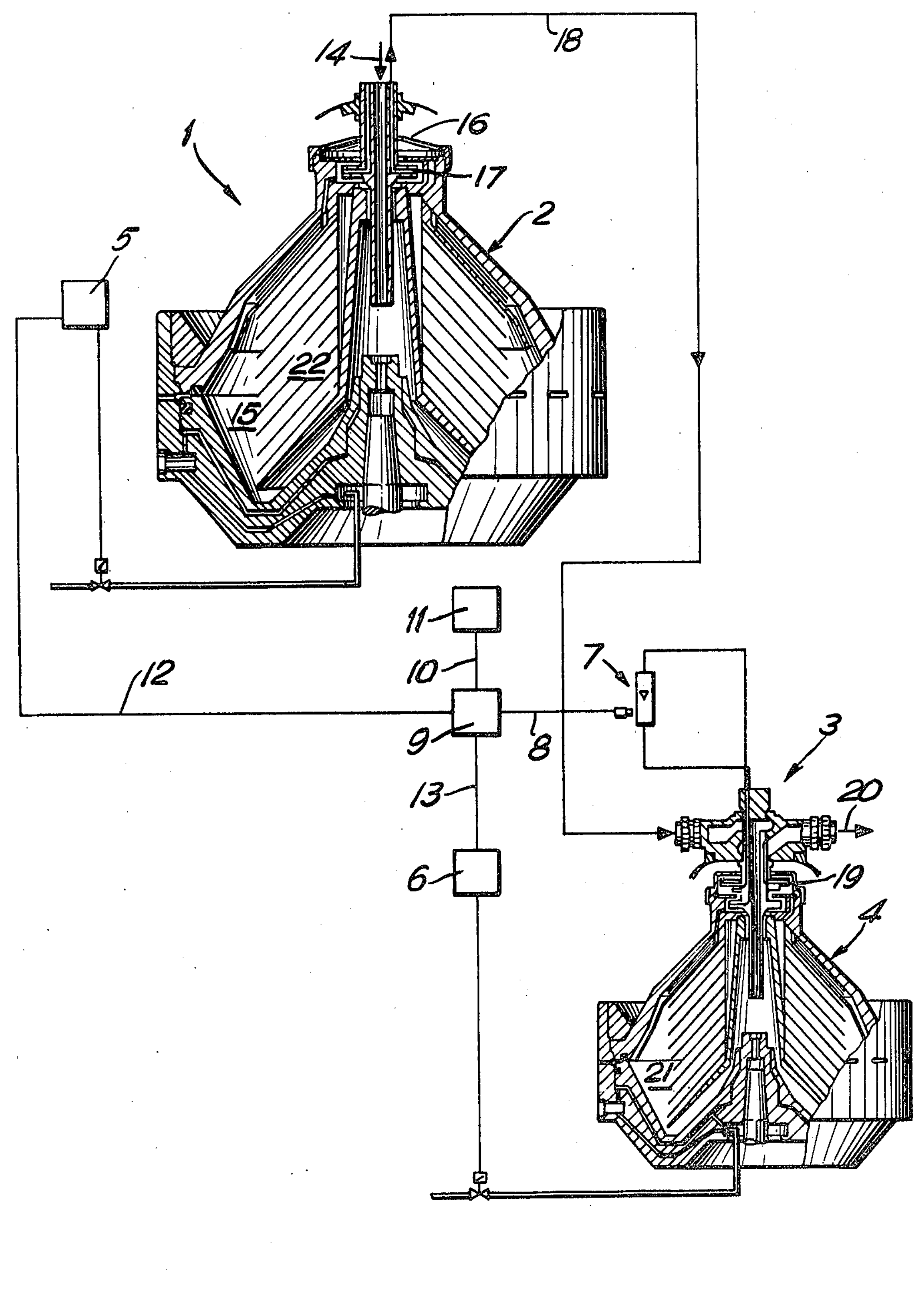
14
18
1
16
17
2
5
22
15
11
10
7
12
9
8
3
13
20
6
19
4
21

SYSTEMS OF SELF-PURGING CENTRIFUGAL SEPARATORS FOR THE SEPARATION AND CLARIFICATION OF LIQUIDS CONTAINING SOLIDS

BACKGROUND OF THE INVENTION

The invention relates to an arrangement of self-purging centrifugal separators for the separation and clarification of liquids, especially heavy oils, which contain solids, at least two separators being connected in series and the first separator serving as a preliminary separator and the second as a clarifier, the purging of the solids from each separator being timed by means of an associated control apparatus.

Such arrangements of self-purging separators are known on board ships, for example, wherein the separation of the heavy oils from water and solids is performed in the first separator, and the clarification of the oil separated and partially purified in the first separator takes place in the second separator. In this separating and clarifying process, a larger amount of the solids contained in the untreated mixture is normally separated in the drum of the first separator than in the drum of the second, clarifying separator.

The self-purging separators used for this purpose have been disclosed, for example, by German Pat. No. 1,297,036, and they are especially suitable for the continuous and automatic operation that is required on board ships and also in numerous other separator installations. In such installations the solids that are separated in the drums are automatically discharged by the partial or complete purging, at certain intervals of time, of the separating chamber or solids chamber of the drum. The operations of purging the drums are initiated mostly by timing controllers such as those known from German Pat. No. 1,142,795.

Self-purging separators in which the purging of the drum is started by timing apparatus can be operated continuously only if the conditions of operation do not change, i.e., the solids content in the liquid and the rate of feed of the latter remain substantially constant (which is rarely the case with heavy oil), such that irregularities in these installations are unavoidable. In the performance of the so-called partial purges that are often practiced in these centrifuges, only a very specific portion of the drum content—normally that corresponding to the solids that have been separated—is to be ejected. If the solids content in the raw liquid is variable, however, while the timing of the purges is fixed, then, when the solids content diminishes, too much of the clear phase, e.g., oil, is ejected together with the solid, and, when the solids content increases, the purge is performed too late, so that too much of the solids can collect in the drum, thus making the removal of the solids difficult both in partial and in total purging operations. In addition, the separating insert built into the drum can become clogged with the solids, thereby greatly reducing the separating effect in the drum or even completely defeating it. Since these perturbances occur very frequently in separators in which heavy oil is processed, measures must be found for automatically eliminating trouble or at least sounding the alarm so that manual remedying of the trouble can be performed.

This is due to the fact that heavy oils, which are subject to very great variations in their content of solids and water, are of a dark and viscous consistency, so that the solids tend to cake up in the solids chamber, they are often very difficult to remove, and the quality of the oils cannot be determined at the outlet of the separator on account of their dark color. For this reason, it is impossible, for example, to monitor the oil outlet of the separator by means of a photoelectric cell, as can be done in the case of other liquids.

SUMMARY OF THE INVENTION

It is the object of the present invention to create an arrangement of self-purging separators for the separation and clarification of liquids, especially heavy oils, containing solid matter, which will detect any trouble in the separator that may result in poorer separating and clarification results, and will attempt to eliminate the trouble automatically, or, after a certain period of time, will automatically sound an alarm.

This object is accomplished in accordance with the invention by the fact that the drum of the second separator following the first separator is additionally provided with an automatic purge control, which is known in itself, its solids chamber is smaller than that of the drum of the first centrifuge, and the purge control is connected to an evaluating apparatus and the evaluating apparatus in turn is connected to the control apparatus and/or to an alarm means.

An automatic purge control, such as the one described in German Pat. No. 2,436,285, if disposed in the clarifying separator, will enable a signal to be given if the solids chamber in the clarifying drum becomes filled prematurely. Such premature filling might be due to a poorer separation of the mixture in the first centrifuge on the line. If such an automatic purge control is used in conjunction with an evaluating means, it can initiate extra purges in the separator drums, and if the trouble is not remedied after a certain amount of time it can actuate an alarm.

Since in accordance with an especially preferred embodiment the capacity of the solids chamber of the clarifier amounts to no more than 10% of that of the solids chamber of the preliminary separating drum, a very sensitive monitoring of the state of operation of the separating centrifuge is possible. Thus the assurance is given that a signal will always be given before the solids chamber and separating insert can become clogged with sludge to such an extent that they cannot be cleaned out by a complete purge, for example.

In a clarifying separator it is possible by providing an automatic purge control to detect not only when the solids chamber is filled up with sludge but also when it is filled with the water that is removed from the oil. Thus it is possible by means of the clarifying centrifuge to detect also any maladjustment of the separating zone in the drum, which causes poor separation of the oil-water mixture.

BRIEF DESCRIPTION OF THE DRAWING

The invention will now be described in detail in conjunction with the attached drawing wherein the centrifuges are shown in partial seciton with a schematic of the controls therefor in accordance with the invention.

DETAILED DESCRIPTION OF THE PREFERRED EMBODIMENTS

In the FIGURE, a self-purging centrifugal separator 1 is equipped with a drum 2, while a second self-purging centrifugal separator 3 has a drum 4 designed as a clarifier. Each drum is connected with a control 5 and 6, respectively, for controlling the timing, for example, of the purges of the drums. The drum 4 of the second separator is furthermore provided in accordance with the invention with an automatic purge control 7 such as the one disclosed by German Patent 2,436,285. From the purge control 7 a control line 8 runs to an evaluator means 9, which in turn is connected by control line 10 to an alarm means 11 and by control lines 12 and 13 to the controls 5 and 6.

The system described above operates as follows:

The mixture that is to be separated and clarified, an oil-water mixture containing solids, heavy oil for example, is delivered to the separating drum 2 of the centrifugal separator 1 through an inlet line 14 at a predetermined rate, with a certain solids content. The separation of the oil-water takes place in this drum and most of the solids are driven within the drum into the solids chamber 15. While the separated, specifically heavier aqueous phase is removed by a separating disk 16 and caught, for example, in the trough of a hood enveloping the drum, the partially clarified oil is delivered by a paring disk 17 and line 18 to the second separator 3. Depending on the content of solids in the mixture, a partial purge of the drum 2 is performed by the control means 5 at set intervals of time, every 10 minutes, for example, whereby the solids are ejected by centrifugal force out of the solids chamber 15 of the drum 2 into a trough also surrounding the drum.

The partially clarified oil, which may still contain small amounts of solids and possibly additional removable water is delivered to the second separator 3 through line 18, where it is subjected to clarification. The clarified oil is discharged through a paring system 19 and a line 20. The solids and water that are removed, collect in the solids chamber 21.

The purges of the second separator 3 normally take place at greater intervals of time, since the accumulation of solids in the solids chamber 21 of drum 4 of this separator is slow. Accordingly, the control means 6 provided for this separator is adjusted such that a purge is initiated only every 30 minutes.

In the case of normal runs, the drum 2 of separator 1 accordingly is purged every 10 minutes, and drum 4 of the second separator 3 is purged every 30 minutes. If irregularities occur in the separator 1 which impair the separation of the mixture—for example due to a higher content of solids in the mixture or to the clogging of the separating insert 22 in the drum 2, a greater amount of solids or of water is delivered to the centrifuge 3 with the oil, and this also entails a more rapid accumulation of sludge in the drum 4 of separator 3. Since the 30-minute purging intervals preset for separator 3 are then much too long, the automatic purge control 7 disposed in drum 4 responds ahead of time and signals the premature filling of the solids chamber 21 to the evaluating means 9 through the control line 8. Impulses can then be transmitted by the evaluating means 9 through control lines 12 and 13 to the control means 5 and 6, which then initiate a number of purges in drums 2 and 4 to eliminate the sludge from the drums. For this purpose, a complete purging of the drums can be performed, for example. If the cleaning of the drums by these purging procedures is unsuccessful, an alarm means 11 is actuated by the evaluating means 9 through control line 10. In this case, a manual elimination of the trouble is necessary. In many cases, however, it is sufficient to perform one or two complete purges of the drums in order to eliminate the solids or water that has collected in the solids chambers and possibly in the separating inserts, thereby restoring the operation of the separators.

In accordance with the invention, the volume of the solids chamber 21 of drum 4 is made substantially smaller than that of the solid chamber 15 of drum 2, and amounts of only 10%, so that a very sensitive control of the state of operation of the separators is assured.

It will be appreciated that the instant specification and claims are set forth by way of illustration and not limitation, and that various modifications and changes may be made without departing from the spirit and scope of the present invention.

What is claimed is:

1. In a system for the separation and clarification of liquids having at least two self-purging centrifugal separators connected in series wherein preliminary separation is effected in the drum of the first separator and clarification is effected in the drum of the second separator and control means for initiating the purging operations of the drums filled with solids in a periodic manner, the improvement wherein: the solid chamber of the drum of the second separator is smaller than that of the first and includes automatic purge control means for non-periodically, initiating a purge thereof in response to a given solids content therein and the control means comprises evaluating means connected to the automatic purge control means for effecting the simultaneous purging of both drums in response to the initiation of a non-periodical purge of the second drum and alarm means connected to the evaluating means for effecting an alarm in response to a predetermined number of purges initiated by the evaluating means.

2. The system according to claim 1, wherein the volume of the solids chamber of the separator drum of the second centrifugal separator is no more than 10% of the volume of the solids chamber of the separator drum of the first separator.

3. In a method for the separation and clarification of liquids containing solids, wherein preliminary separation is effected in the drum of a first self-purging centrifugal separator, clarification is effected in the drum of a second series connected self-purging centrifugal separator and purging is initiated in the two drums periodically, the improvement comprising providing the second drum with a smaller volume of the solid chamber, automatically purging the second drum non-periodically in response to a given solids level therein, purging both drums non-periodically and simultaneously in response to the automatic purging of the second drum, and effecting an alarm in response to a predetermined number of non-periodic purges.

* * * * *

UNITED STATES PATENT AND TRADEMARK OFFICE

CERTIFICATE OF CORRECTION

PATENT NO. : 4,411,645

DATED : October 25, 1983

INVENTOR(S) : Aloys Tenthoff

It is certified that error appears in the above-identified patent and that said Letters Patent is hereby corrected as shown below:

| | |
|---|---|
| Title | Should read "System of...." |
| Col. 2, line 60 | Delete "seciton" and insert --section-- |
| Col. 4, line 14 | Delete "of" first occurrence and insert --to-- |
| Col. 4, line 32 | After "non-periodically" delete "," |

Signed and Sealed this

*Seventeenth* Day of *January 1984*

[SEAL]

*Attest:*

GERALD J. MOSSINGHOFF

*Attesting Officer*

*Commissioner of Patents and Trademarks*